United States Patent
Pogue

(10) Patent No.: US 7,716,218 B1
(45) Date of Patent: May 11, 2010

(54) METHOD AND SYSTEM FOR ENHANCED SEARCH ENGINE TUNING

(75) Inventor: Michael Pogue, Sunnyvale, CA (US)

(73) Assignee: Oracle America, Inc., Redwood Shores, CA (US)

( * ) Notice: Subject to any disclaimer, the term of this patent is extended or adjusted under 35 U.S.C. 154(b) by 312 days.

(21) Appl. No.: 11/880,149

(22) Filed: Jul. 20, 2007

(51) Int. Cl.
G06F 17/30 (2006.01)
(52) U.S. Cl. .................................. 707/728; 707/730
(58) Field of Classification Search ............... 707/5, 707/3
See application file for complete search history.

(56) References Cited

U.S. PATENT DOCUMENTS

| | | | |
|---|---|---|---|
| 2005/0050023 A1* | 3/2005 | Gosse et al. | 707/3 |
| 2007/0185865 A1* | 8/2007 | Budzik et al. | 707/5 |
| 2007/0233672 A1* | 10/2007 | Sanfacon et al. | 707/5 |

OTHER PUBLICATIONS

Anyanwu et al., "SemRank: ranking complex relationship search results on the semantic web", Proceedings of the 14th international conference on World Wide Web, May 10, 2005, P-117-127. Retrieved from the Internet:<URL: http://portal.acm.org/ft_gateway. cfm?id=1060766&type=pdf&coll=GUIDE&dl=GUIDE &CFID=71061757&CFTOKEN=70517317>.*

Si et al., "Using sampled data and regression to merge search engine results", Proceedings of the 25th annual international ACM on Research and development in information retrieval, Aug. 11, 2002. Retrieved from the Internet:<URL: http://portal.acm.org/ ft_gateway.cfm?id=564382&type=pdf&coll=GUIDE&dl=GUIDE &CFID=71062412&CFTOKEN=74939423>.*

* cited by examiner

*Primary Examiner*—John E Breene
*Assistant Examiner*—Dennis Myint
(74) *Attorney, Agent, or Firm*—Marsh Fischmann & Breyfogle LLP; Jonathon A. Szumny; Kent A. Lembke

(57) ABSTRACT

A method and system for enhanced tuning of search engine parameters includes receiving a search parameter at a search engine. The search engine is equipped with a plurality of tunable knobs set at an initial setting. A search result having a plurality of result objects is generated for the search parameter based on the initial setting of the plurality of tunable knobs. A relevancy score is associated with each of the result objects in the generated search result and the search result is presented at an user interface. The search engine identifies one or more result objects from the presented search result that are not selected over time. The relevancy score of the identified non-selected result objects are adjusted dynamically. The plurality of tunable knobs in the search engine are tuned using one or more search algorithms to obtain optimal search result based on the adjusted relevancy scores and the non-selected result objects.

15 Claims, 5 Drawing Sheets

| Search Result Page | Penalty | Relevancy score |
|---|---|---|
| Result Object 1: //URL/Link1/ | -3 | 997 |
| Result Object 2: //URL/Link2/ | -2 | 998 |
| Result Object 3: //URL/Link3/ | -1 | 999 |
| Result Object 4: //URL/Link4/ | -1 | 999 |
| Result Object 5: //URL/Link5/ | 0 | 1000 |

| Experiment | Change |
|---|---|
| 1 | $K_1$ |
| 2 | $K_2$ |
| 3 | $K_3$ |
| 4 | $K_4$ |

| Experiment | Change |
|---|---|
| 1 | $K_1, K_2$ |
| 2 | $K_2, K_3$ |
| 3 | $K_3, K_4$ |

METHOD AND SYSTEM FOR ENHANCED SEARCH ENGINE TUNING

CROSS REFERENCE TO RELATED APPLICATIONS

This application is related to U.S. patent application Ser. No. 11/654,352, filed on Jan. 17, 2007, entitled "Method and System for Automatic Distributed Tuning of Search Engine Parameters." The disclosure of the above-identified related application is incorporated herein by reference.

FIELD OF THE INVENTION

The present invention relates generally to search engines used by computing systems to find particular data, and more particularly to methods for enhanced tuning of search engine parameters to improve search performance.

BACKGROUND

Description of the Related Art

The Internet has emerged to be the largest repository of information that users around the world are able to access and share. The information dispersed across countless individual computer systems around the world is constantly changing and has no recognizable organization. In order to help a user to locate information of interest on the Internet, various mechanisms, such as directories and search engines, have been developed. A search engine is a computer software program designed to help users of the Internet locate information based on specific topics or keywords. A search engine visits various websites, collects and indexes Internet resources (Web pages, Usenet Newsgroups, programs, images, etc.) and dynamically builds a database classifying the Internet resources associated with different web sites. When a user accesses a search engine and submits a parameter (e.g. a keywords or keywords), the indexed database at the search engine is searched and results associated with the parameter are returned as search result (or list of results).

A typical search engine includes a wide variety of criteria based on the submitted parameter that determine the extent of indexing of the database and the organization of search results presented to the user. In order for the search engine to provide relevant search results, search engine programmers must adjust a multitude of parameters associated with various criteria. This approach presumes that a typical programmer has a fairly good knowledge of the workings of the search engine. A problem arises when the number of adjustable criteria that may be applied to a parameter are huge or the relative adjustment of one criterion negatively affects the setting of other criteria.

In addition to search engines used on the Internet, some search engines are configured for Intranets. Intranets are similar to the larger scale Internet, but the data content on a particular Intranet may be restricted to a particular company or organization. In such an instance, the Intranet includes comprehensive Intranet databases of past work, articles and associated documents that are designed to be accessible only by the organization's members, employees, or others with authorization. To find a particular document, a user conducts a search. The search, as is common on larger scale Internet searches, is determined by various criteria. Each criterion for the search is given some weight. Based on the setting for the different criteria, the search is conducted. If a sensitivity of a particular criterion is adjusted, such adjustments may affect other settings within the particular criterion or other criteria. In other words, adjustments to a given criterion will affect other criteria, and sometimes, even the most experienced search engine programmer will find it difficult to reach the best settings on all criteria, as they all can affect each other.

In order to address this issue, some of the search engines provide the option of directory or keyword searches. In some other search engines, the back-end of the search engine software is modified to enable cataloguing the most relevant search pages and indices. In this case, the popularity of a web site is used to determine the relevancy. In yet other search engines, the users are presented with a set of questions and answers to determine the search parameters so as to fine tune the search. Although these techniques have shown somewhat promising results, they still fall short of providing a fairly accurate list of relevant search results.

In view of the foregoing, it would be advantageous to have a mechanism that can automatically tune search engine parameters to generate relevant search results.

SUMMARY

The present invention fills the need by providing a search engine that performs enhanced tuning of search engine parameters. The search engine receives a search parameter through a user interface and performs a search using the search parameter. The search engine is equipped with a plurality of tunable knobs related to the search parameter set at an initial setting. The plurality of tunable knobs may be adjusted over time based on the search parameter to obtain an optimal search result. A search result is generated based on a search conducted by the search engine using the initial settings of the tunable knobs. The search result includes a plurality of result objects. Each of the result objects of the search result is associated with a relevancy score. The search result is presented at a user interface. The search engine tracks the result objects that have not been selected over time from the generated search result and dynamically adjusts the relevancy score for the corresponding result objects accordingly. The search engine tunes the plurality of tunable knobs using one or more search algorithms based on the adjusted relevancy score of the non-selected result objects over time. The tuning of the plurality of tunable knobs is performed such that the result objects with significant relevancy scores are listed at the top and the result objects with less relevancy scores are moved down in the search result list. The relevancy score of the result objects indicate the relevancy of the search result with reference to the search parameter.

It should be appreciated that the present invention can be implemented in numerous ways, including as a system or a method. Several inventive embodiments of the present invention are described below.

In one embodiment, a method for enhanced tuning of search engine parameters is provided. The method includes receiving a search parameter at a search engine. The search engine is equipped with a plurality of tunable knobs set at an initial setting. A search result having a plurality of result objects is generated for the search parameter based on the initial setting of the plurality of tunable knobs. A relevancy score is associated with each of the result objects in the generated search result. The search result is presented by the search engine. The search engine identifies one or more result objects from the presented search result that are not selected over time. The relevancy score of the corresponding result objects not selected over time are dynamically adjusted. The plurality of tunable knobs in the search engine are automatically tuned using one or more search algorithms to obtain optimal search result based on the adjusted relevancy scores and the non-selected result objects.

In another embodiment, a system for enhanced tuning of search engine parameters is provided. The system includes a user interface to receive a search parameter and a search engine to conduct the search based on the search parameter. The search engine is communicatively connected to the user interface to receive the search parameter and is equipped with a plurality of tunable knobs set at an initial setting. The search engine generates a search result and forwards the search result to the user interface. The search result includes a plurality of result objects each of which is associated with a relevancy score. The search engine identifies one or more result objects that have not been selected over time and dynamically adjusts the relevancy score of the identified non-selected result objects accordingly. The search engine then conducts tuning of one or more of the plurality of tunable knobs using one or more search algorithms based on the adjusted relevancy score and the non-selected result objects over time, resulting in an optimal search result.

The present invention, thus, describes system and method for enhanced tuning of search engine parameters to obtain an optimal search result.

BRIEF DESCRIPTION OF THE DRAWINGS

The invention may best be understood by reference to the following description taken in conjunction with the accompanying drawings. These drawings should not be taken to limit the invention to the preferred embodiments, but are for explanation and understanding only.

DETAILED DESCRIPTION

The present invention describes a system and method for providing a search engine that performs enhanced tuning of search engine parameters. Accordingly, the present invention includes receiving one or more input search parameters at the search engine. The search engine is equipped with a plurality of tunable knobs that are set at an initial setting. A search result is generated by the search engine based on the one or more input search parameters and an initial setting of the tunable knobs and is presented at a user interface. A tunable knob, as used in this application, is defined as a configuration parameter provided to a search engine by a developer. The search result includes a plurality of result objects. A relevancy score is associated with each result object in the search result generated by the search engine. Each result object corresponds to one or more associated tunable knobs. The search engine identifies one or more result objects associated with the search result that is not selected over time. The search engine dynamically adjusts the relevancy score of the identified non-selected result objects. The search engine then tunes one or more of the tunable knobs based on adjusted relevancy scores and non-selected result objects from the presented search result, to obtain an optimal search result.

Advantages of the current invention are identified herein. The non-selection of one or more result objects over a period of time indicates the order of relevancy of these non-selected result objects in the search result. The order of relevancy information is used to adjust the relevancy score of the result objects in order to fine tune various tunable knobs so that subsequent searches can use the tuned tunable knobs to provide more focused and relevant search results to a user. Additionally, the present invention accommodates various user's ever-changing requirements by providing tunable knobs that can be repeatedly adjusted over time without requiring a programmer to continually make guesses as to which parameters need adjustment and what degree of adjustment to make.

Several embodiments for providing an enhanced tuning of tunable search engine parameters within a computing system are described. It should be appreciated that the present invention can be implemented in different ways such as a system or a method. It will be apparent to those skilled in the art that the present invention may be practiced without some or all of the specific details set forth herein.

To facilitate an understanding of the embodiments, a high level overview of the computing system will now be described. The current embodiment is in no way restrictive but should be treated as an exemplary embodiment.

Figure 1A:
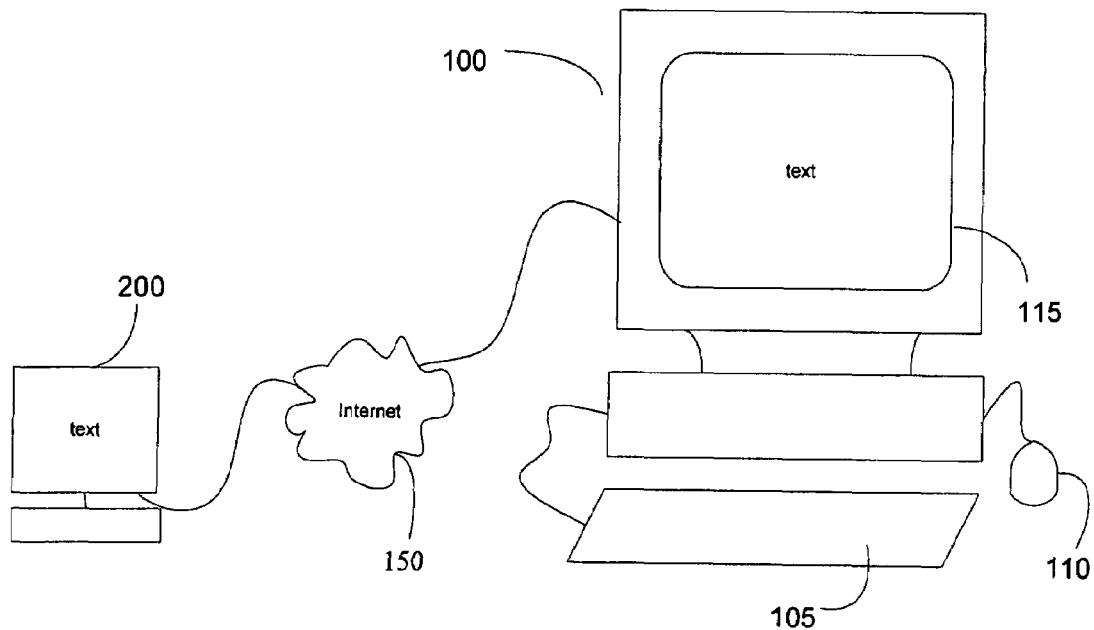
FIG. 1A illustrates a high level overview of a computer system used in carrying out an embodiment of the invention.

FIG. 1A illustrates a high-level overview of a client-server system through which an embodiment of the invention can be implemented. Accordingly, a user interface in the form of a client computer 100 is communicatively connected to a search engine residing on a server 200 through Internet 150. In other embodiments, a local or wide area network may be used instead of the Internet 150. In this embodiment, the search engine is configured to be on the server 200 and the user interface is construed to be on a client computer 100. The search engine may be integrated into a client computer 100 along with a user interface and may access the network of computers to receive a plurality of result objects over the Internet 150. On a similar note, the user interface may be any computing device that may be configured to receive one or more search parameters and to forward the search parameters to a search engine located on the same computing device or on a different computing device which is networked or has access to the Internet 150. Referring back to FIG. 1A, the client computer 100 includes an input device, such as a keyboard 105 or a mouse 110, and an output device, such as a display device 115, communicatively connected to the client computer 100. The input device at the client computer 100 is used to provide one or more search parameters and to select one or more search result objects when a search result is made available at the user interface. The display device is used in displaying a search result.

Figure 1B:
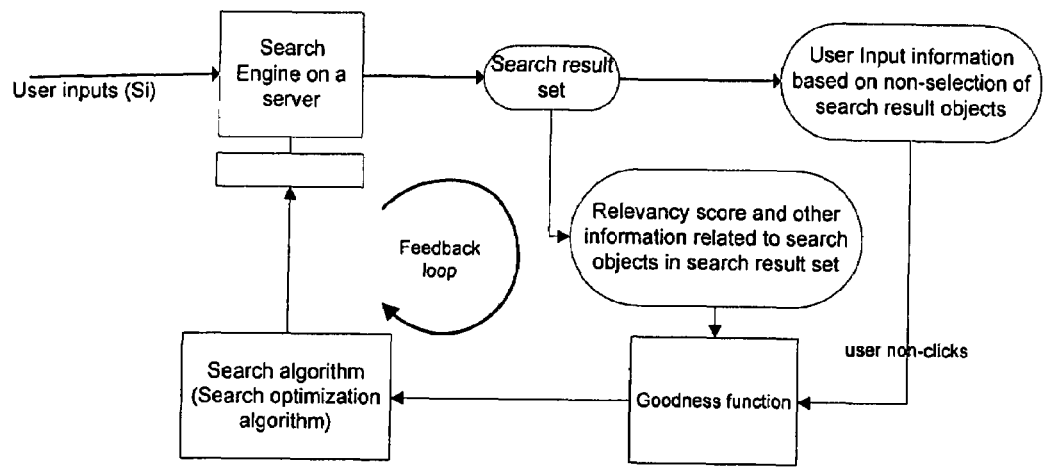
FIG. 1B is a simplified block diagram illustrating a mechanism of an enhanced tuning process, in one embodiment of the invention.

FIG. 1B is a simplified block diagram illustrating a mechanism of an enhanced tuning process, in one embodiment of the invention. As shown, a user provides one or more search parameters to a search engine located on a server 200 through a user interface associated with a client computer 100. These search parameters provided by the user(s) constitute one or more input search parameters ($S_i$) for the search engine. The search engine is equipped with a plurality of tunable knobs ($K_i$) that are set at an initial setting. These tunable knobs are defined as a set of configuration parameters that are provided by a developer of the search engine.

The search engine performs an initial search based on the input search parameters ($S_i$) received from the user and the initial tunable knob settings at the search engine to generate a search result. The search result may be a function represented as $R=fn(S_i, K_i)$. The generated search result, that includes a plurality of result objects, is presented to the user. The search engine provides relevancy score for each of the result objects in the search result. The search engine then uses information from a user interface and other information (such as relevancy score) related to the generated search result to arrive at a "goodness" function. The information from a user interface may be in the form of user non-clicks wherein one or more search result objects are not selected from the presented search result, the user non-clicks over time indicating the non-relevancy of the search result objects to the search query. Other information related to the generated search result may include factors such as processor time to obtain search result, memory utilization, relevancy of search site, etc. Processor time, memory utilization, and relevancy of search site, for example, may be tunable knob settings that are relevant to the generation of the overall search result. The goodness function is defined with information related to the generated search result, as input variables. This defined goodness function is, then, used by an optimization algorithm to fine-tune the tunable knobs over time to provide an optimal search result. The process of identifying non-relevant result objects from a user interface and defining a goodness function to fine-tune the search at the search engine is an on-going process, so as to adaptively provide an optimal search result to a user query. The on-going adjustment process within the search engine allows the search engine to accommodate the ever-changing search requirements of the users.

Figure 2:
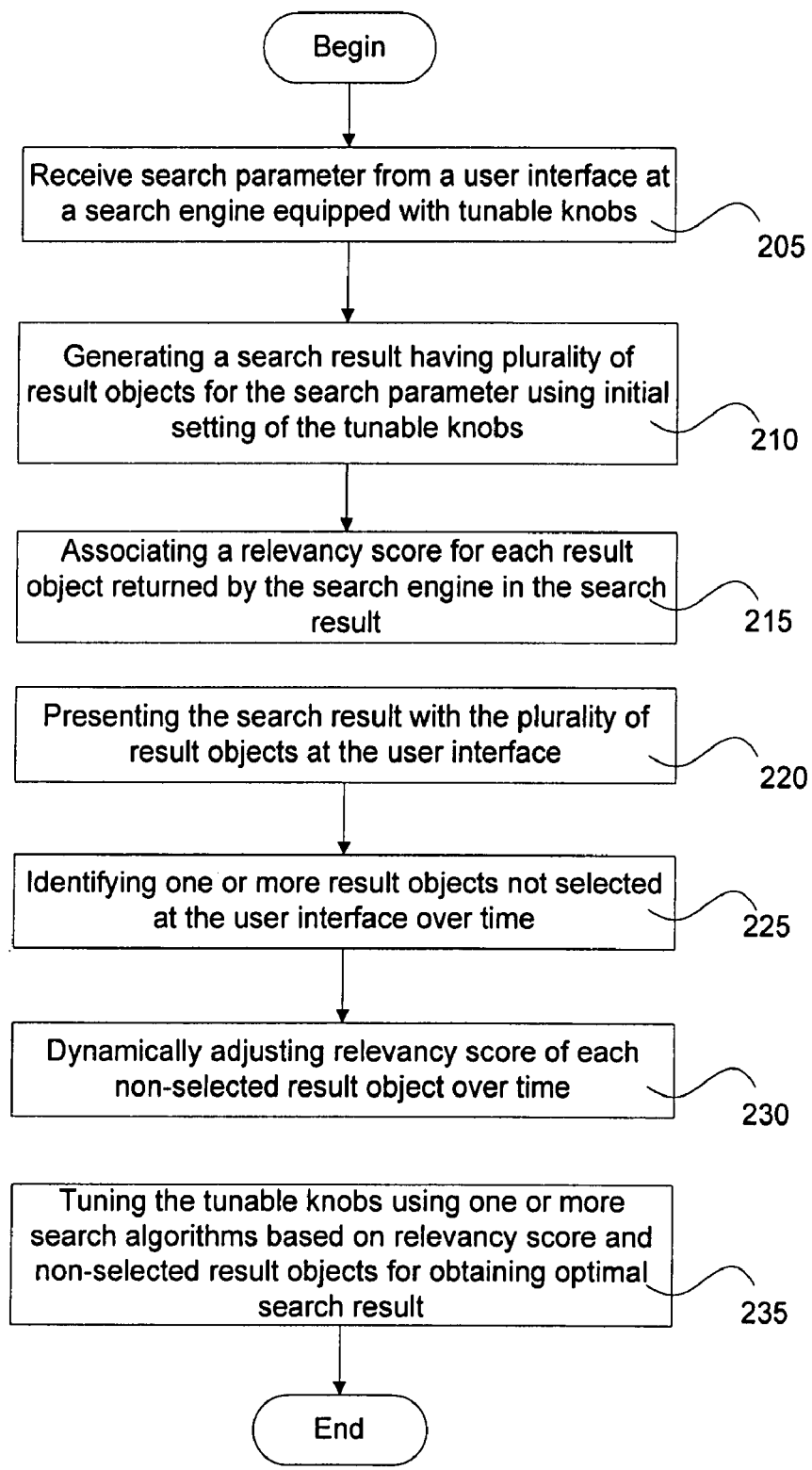
FIG. 2 illustrates a flowchart of operations for obtaining an optimal search result, in one embodiment of the invention.
Figure 4:
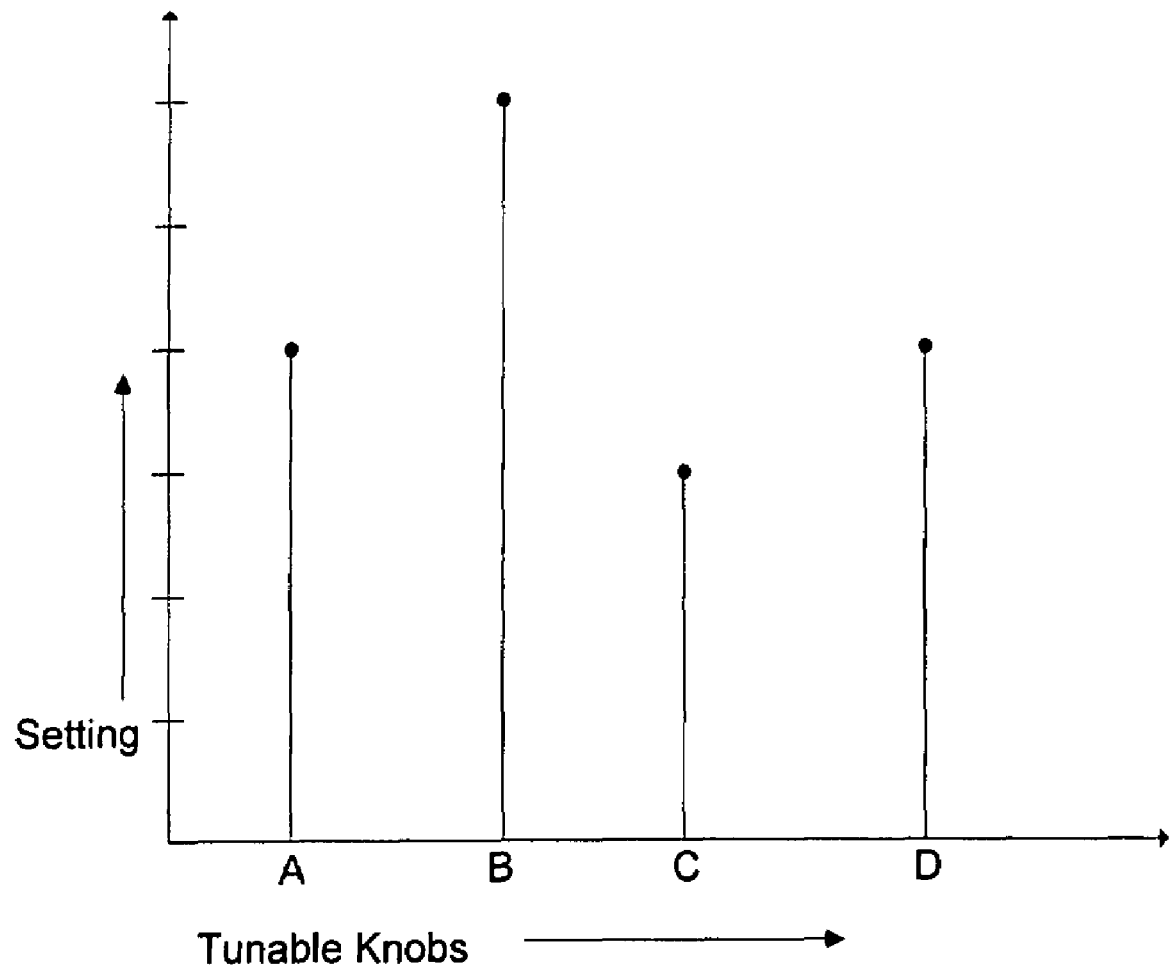
FIG. 4 illustrates an initial setting of a plurality of tunable knobs and the weight associated with each knob used in implementing a search query, in one embodiment of the invention.

FIG. 2 illustrates an overview of the process operations involved, in one embodiment of the invention. The method begins at operation 205 wherein a search parameter is received at the search engine. The search parameter is received at a user interface and forwarded to the search engine. The search parameter identifies a user's preference for conducting a search. The search engine includes a plurality of tunable knobs set at an initial setting. Each of the tunable knobs initial setting may take into consideration the tunable knobs weight in the overall relevancy of the search. Each of the tunable knobs, for example, may be associated with one or more criteria of search parameter such as nouns, adjectives, adjacency of one or more words within search parameter, relevancy of search site from which the result objects are obtained, pages containing code, body text, italicized text and their respective weights in the overall search. An example of the initial setting of knobs A, B, C, and D is shown in FIG. 4. As illustrated, setting of knob B may affect the search more significantly than settings of knobs A, C and D. The settings of Knobs A and D may affect the search equally. Setting of Knob C may affect the search least. The initial setting of the tunable knobs may be based on a random algorithm executed at the search engine.

Figures 3A, 3B:
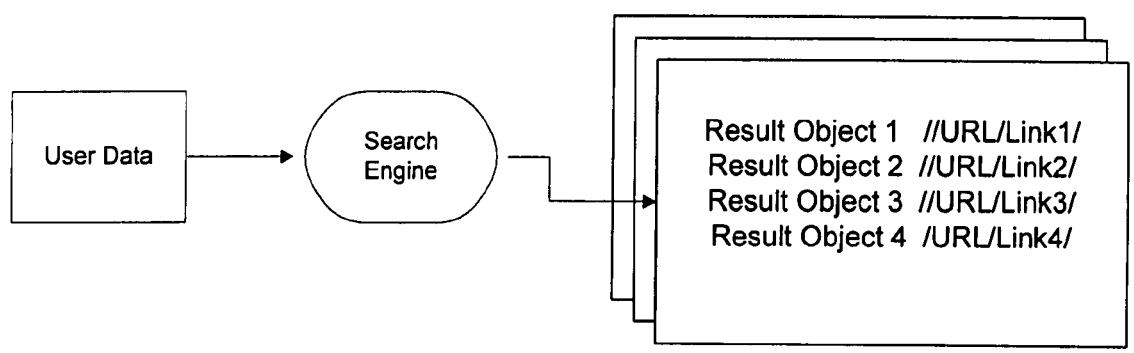
FIG. 3A illustrates a preliminary search result obtained using a search engine, in one embodiment of the invention.
FIG. 3B illustrates the search result with initial relevancy score and adjustments to be made to the relevancy score, in one embodiment of the invention.

In operation 210, the search engine performs a search based on the search parameter using initial tunable knob settings and generates a search result. A sample search result obtained using an input search parameter is illustrated in FIG. 3A. As shown, the generated search result includes a plurality of result objects in the form of user links. Each of the result objects is associated with a tunable knob setting. In one embodiment of the invention, the search engine may perform two (or more) searches for every search request. In this embodiment, the search engine performs a first search with the search parameter ($S_i$) and the initial setting of the plurality of tunable knobs ($K_i$) where the first search result may be a function of the search parameter ($S_i$) and the initial setting of the tunable knobs ($K_i$), such as $R_1=Fn(S_i, K_i)$. The search engine conducts a second search by varying one or more of the tunable knobs to obtain a second setting of the tunable knobs ($K_i'$). The search engine uses this adjusted setting of tunable knobs to conduct a second search to generate a second search result where the second search result is a function of the search parameter ($S_i$) and the second setting of the tunable knobs ($K_i'$), such as $R_2=Fn(S_i, K_1')$. In an embodiment of the invention, one of the available plurality of tunable knobs is identified and adjusted to arrive at a second setting. In another embodiment, some of the available tunable knobs are adjusted to arrive at a second setting. The search results so obtained include a plurality of result objects. These result objects may include links to text, images, audio clips, video clips and other interne resources. In some cases, the search may yield one or more result objects that are common to both the search results.

In the embodiment where two search results are conducted, the search engine, upon generating the first and second search results $R_1$ and $R_2$, combines the two search results $R_1$ and $R_2$ into a combined search result, R. The two search results may be combined in a variety of ways. In one embodiment, the first search result is combined with the second search result in a random fashion so that result objects from the first search result are randomly interleaved with the result objects from the second search result. By interleaving the search results randomly, factors affecting the relevancy and non-relevancy, such as presentation bias, may be eliminated. Presentation bias is bias present in a user's decision of choosing or not-choosing an object from a list of objects based on the position of the object rather than its relevancy. For example, in a web search, users may pay significantly more attention to search results ranked higher than those ranked lower even though the lower ranked search results may be more relevant to a user's information need. The random interleaving of search results eliminates such presentation bias, thus providing for an unbiased representation of search result relevancy. If a result object is found in both the first search result and a second search result, the combined search result may include a single representation of the duplicate result object.

The search engine associates a relevancy score for each result object in the generated search result, as illustrated in operation 215. The relevancy score may be a random value that indicates the relevancy of the result object in the overall scheme of the search result. In one embodiment, the higher the relevancy score the more significant the result object is to a user's search query. When a search result is first generated in response to a search query, the search engine associates a single relevancy score to each of the result objects in the search result. For example, in an embodiment illustrated in FIG. 3B, each of the result objects is initially associated with a relevancy score of 1000. Although a number value has been used to indicate the relevancy score for each of the result objects, the relevancy score is not restricted to a number value or to a specific number. Other forms of identifying the relevancy score may be used. The same relevancy score is initially associated with each of the result objects due to the fact that the result objects are all at the same level of relevancy prior to a user selecting specific result objects.

The search result with associated relevancy score is then presented at the user interface as an indexed list of result objects, as illustrated in operation 220. Each of the result objects in the search result is associated with specific tunable knob settings. In case of the combined search result, each result object is associated with one of the two tunable knob settings. The search result may be presented at the user interface on a display device 105 communicatively connected to the user interface based on specific presentation criteria such that the most relevant result objects are presented at the top of the search result page. In one embodiment, the result objects may be presented at the user interface based on the relevancy score of each of the result objects so that the result objects with higher relevancy scores are presented at the top of the search result. In another embodiment, the result objects may be presented at the user interface based first on the weighting factor associated with corresponding tunable knobs setting associated with the result objects and then on the relevancy score of each of the result objects. For instance, a first result object may have a lower relevancy score but may be associated with a tunable knob setting that has a higher weighting factor. A second result object may have a higher relevancy score but may be associated with a tunable knob setting that has a lower weighting factor. The search engine will present the two result objects by placing the first result object higher in the search result page than the second result object as the weighting factor of the corresponding tunable knobs setting for the first result object outweighs that of the second result object.

The process continues to operation 225, wherein the search engine identifies one or more result objects not selected at the user interface. In order to identify one or more result objects not selected at the user interface, the search engine first identifies result objects that have been selected at the user interface. The search engine uses the selected result objects to identify non-selected result objects. A user, upon presentation of the search result, selects a result object. One way of identifying which result objects have been selected is by way of an "on-click" event. The search engine uses the information related to the selection of the result object at the user interface to identify result objects that have not been selected by the user. The non-selected result objects provide information to the search engine such as order of relevancy to user's search query and identify one or more tunable knob settings associated with the non-selected result objects currently available at the search engine. The non-selection of the result objects from a plurality of users are collected over a period of time and used to determine the associated tunable knob settings that need to be tuned to provide a more relevant search result.

Upon identifying the non-selected result objects, the search engine dynamically adjusts the relevancy score associated with each of the identified non-selected result objects, as illustrated in operation 230. In one embodiment, the relevancy scores of the identified non-selected result objects are adjusted by penalizing the non-selected result objects. The penalizing of the non-selected objects may include varying degrees of penalty and may be implemented in variety of ways. In one embodiment, the search engine may penalize non-selected result objects that are "above the fold". Above the fold, as used with reference to the non-selected result objects in this application, means result objects that are presented at the top of a search result page which can be viewed without scrolling. In this embodiment, the non-selected result objects that are above the fold may be penalized more than the non-selected result objects that are below the fold. Along similar lines, in another embodiment, the non-selected result objects that are above a selected result object and closer to the top of the ranking may be penalized more than the ones that appear below the selected result objects. In yet another embodiment, if a "next page of search result" is clicked before any result objects in a first result page are clicked within some reasonable time, all the non-selected result objects present in the first page may be penalized by a pre-set value. The logic to penalize the non-selected result objects may be pre-defined in the search engine based on different scenarios and used to adjust the relevancy score of the non-selected result objects.

FIG. 3B illustrates a search result page with a plurality of result objects and penalty scores applied by the search engine to each of the non-selected result objects, in one embodiment of the invention. When result object 5 is clicked, the on-click event is triggered at the search engine which, in turn, identifies result objects 1 through 4 as non-selected result objects and adjusts the relevancy score of each of the non-selected result objects in the search result page using a penalty score. In this embodiment, the result objects may be considered as above the fold. The penalty scores identify the penalty awarded to the non-selected result objects and may vary based on their relative location on the search result page. For example, based on the proximity to the top of the search result page, the non-selected result object 1 is penalized more than non-selected result object 2, and non-selected result objects 3 and 4 are penalized at the same level but by a lower value than the non-selected result objects 1 and 2. The relevancy score of each of the non-selected result objects are adjusted based on the penalty score associated with each of the non-selected result objects. In this example, the relevancy scores of each of the non-selected result objects are reduced by the penalty score associated with the non-selected result objects, as shown in FIG. 3B. The relevancy score of each of the result objects returned by the search result along with the adjusted relevancy scores of the non-selected result objects are maintained in a database. The search engine references this database when presenting the search result objects at the user interface.

The process concludes when the tunable knobs associated with the identified non-selected result objects are tuned using one or more search algorithms based on the relevancy score and non-selected result objects, as illustrated in operation 235. The information pertaining to non-selected result objects may be gathered over time and used in identifying the appropriate tunable knobs to tune in order to obtain an optimal search result.

In the embodiment where two search results are generated, a counter may be associated with each setting of tunable knobs. In this embodiment, the search engine identifies the tunable knob setting associated with each of the non-selected result objects and increments the corresponding counter. In the case where a non-selected result object is common to both first search result and second search result, the counters associated with both of the tunable knob settings are incremented. Information related to the non-selection of result objects may be gathered over a period of time and the associated counters adjusted. At the end of the period, the search engine compares the two counters associated with the two tunable knob settings.

If the counter value for a particular tunable knob setting exceeds the other counter value significantly, then that particular tunable knob setting is considered to have more non-relevant result objects to the search query and is, therefore, discarded. In this case, the other tunable knob setting with fewer amounts of non-selected result objects is fine-tuned in order to provide a more optimal search result. The process continues with the adjusted tunable knob setting as the initial setting, one or more of the tunable knobs adjusted to obtain a second setting and the process of fine tuning the search continues. In order to obtain an optimal setting of n tunable knobs, a multivariable derivative (multivariable function) of the n tunable knobs may be used.

If the first counter value is close to the second counter value, then the two tunable knob settings may contain almost the same amount of non-relevant result objects and are, therefore, indistinguishable. In such a case, the search engine may randomly pick one of the two tunable knob settings to adjust and tune. In another embodiment, both sets of tunable knob settings may be adjusted or a new set of tunable knob settings may be chosen.

For the process of adjusting and re-adjusting the tunable knob settings to obtain an optimal search result described above, reference can be made to the co-pending application, U.S. patent application Ser. No. 11/654,352, filed on Jan. 17, 2007, entitled "Method and System for Automatic Distributed Tuning of Search Engine Parameters." The co-pending application assigned to the assignee is incorporated herein by reference.

In order to fine tune the identified tunable knob settings, the search engine may engage one or more "hill-climbing" search algorithms available to the search engine that uses the multi-variable function of the tunable knobs to identify the local maxima and the global maxima setting of the tunable knobs. These search algorithms tune the appropriate tunable knob settings over time, without needing to explicitly understand the underlying weight of each tunable knob setting or the interaction between knobs. Some of the "hill-climbing" search algorithms that may help in finding the best setting of the tunable knobs to obtain optimal search include Powell's method, simulated annealing, genetic algorithms, and neural network. It is noted here that the above list of available algorithms is not an exhaustive list and other multivariable optimization algorithms may be used to arrive at the optimal search result. These multivariate optimization algorithms are often capable of identifying one or more local maxima and a global maximum. Essentially, these algorithms figure out what the correct setting of the tunable knobs are, regardless of the weight each of the tunable knob settings have in the overall search. If a particular tunable knob has a low effect in reaching the overall global maximum, then it is irrelevant where that tunable knob is set. These algorithms may try to change the setting of that particular tunable knob and once the algorithms realize that the various settings of the particular tunable knob are immaterial to the search result, may stop changing that tunable knob. The ideal search result is obtained when the tunable knobs are set such that the resulting relevancy is at a global maximum. As mentioned earlier, the global maximum setting identifies the setting of the tunable knobs which produces an optimal search result. This global maximum setting of the tunable knobs is then used in subsequent searches as the initial setting and the process cycle repeats until an optimal search result is obtained.

In a real world situation, search engine users and their requirements keep changing. The present invention accommodates these changes by dynamically re-setting the tunable knobs based on the non-selection of result objects over time. Every time a new search query is received, new search results are generated for the new search query and presented to the user. The search engine captures non-selected result objects over a period of time and fine-tunes the appropriate tunable knob settings to obtain the optimal search result. The selected result objects identify the associated tunable knob setting to tune. Using the current setting of the tunable knobs as the initial setting in subsequent searches, the search is constantly fine-tuned to produce a more focused and optimal search result. A sample pseudo-code that illustrates the various operations of the present invention is provided herein:

PSEUDO-Code for Single Search Result:

```
For each (query from a user)
{
   ResultSet1. search( );
   presentResults (user, resultSet1);
   for each (link that isn't clicked on)
   {
   decreaseWeightingOfLinksLike    (thatLink,    someAmount);
   }
}
)
```

PSEUDO-Code for Generating Two Search Results and Using the Search Results to Fine-Tune the Appropriate Tunable Knob Setting

```
currentKnobSet=K0;
testKnobSet=K0+delta;
   //where delta means that the position
   //of at least one knob is changed from K0
   For each (query from a user)
   {
   resultSet1=search (currentKnobSet);
   resultSet2=search (testKnobSet);
   presentResults (user, randomInterleave (resultSet1, result-
      Set2);
      //results are randomly interleaved, to eliminate
      //presentation bias. If there are duplicates, merge them.
   For each (link that isn't clicked on)
   {
      searchEngine[that returned that particular result]+=1;
      //if this was a merged dup, credit both.
      decreaseWeightingOfLinksLike    (thatLink,    someA-
         mount);
   }
   after (some pre-set amount of time)
   {
      if (searchEngine[testKnobSet]<
         searchEngine[currentKnobSet])
      {
         currentKnobSet=testKnobSet;
         testKnobSet=newDeltaUsingOneOf
         Powell's Method,
         Simulated Annealing,
         Genetic Algorithm,
         Neural Net);
      }
   }
}
```

Although some of the aforementioned embodiments were discussed with two search results being generated and used to provide a combined search result by interleaving the two search results and presenting the combined search result to the users, the generation of search result is not restricted to generating two search results with two different tunable knob settings. More than two tunable knob settings may be employed and the results obtained from each of the tunable knob settings may be interleaved and presented to the users as a combined search result. Further, each of the tunable knob settings is associated with a counter and the respective counters are incremented when non-selected result objects from the respective search results are identified over time. The counters are compared after a certain period of time to determine the most relevant setting of tunable knobs to be tuned for obtaining the optimal search result.

Figures 5A, 5B, 5C:
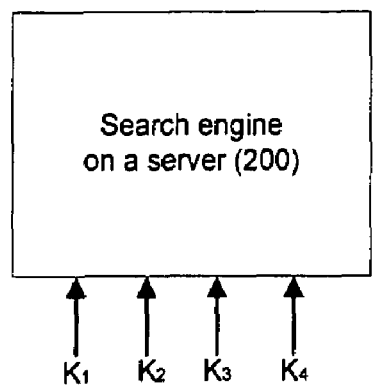
FIGS. 5A-5C illustrate the tuning process using a plurality of tunable knobs without and with factor analysis.

Further, to allow the tuning process to tune faster, factor analysis may be used. Factor analysis is a mathematical tool which can be used, in this case, to fine tune tunable knob settings faster in a shorter number of steps and by conducting fewer experiments (tunable knob settings). The factor analysis, with reference to the current embodiments of the invention, can be explained in more detail with reference to FIGS. 5A-5C. FIG. 5A shows a search engine with a plurality of tunable knobs available for tuning. FIG. 5B identifies the tuning that has to be performed without factor analysis. Every time a tunable knob is tuned, an experiment is performed. Accordingly, experiment 1 is performed by tuning tunable knob K1, experiment 2 with tunable knob K2, and so on. FIG. 5C identifies the number of experiments that need to be performed using a sample factor analysis. As shown in FIG. 5C, in experiment 1 tunable knobs K1 and K2 are tuned to arrive at some optimal search result. In experiment 2, tunable knobs K2 and K3 are tuned to arrive at some optimal search result, and so on. By providing an automatic tuning of more than one tunable knob every time a search query is received at the search engine, a more effective search is implemented in a shorter period of time. The process is very robust and easily accommodates the changing demands of the users and their requirements. The process is simple to implement and does not have to be customized every time a new search requirement or a new user is added.

The invention may be practiced with other computer system configurations including hand-held devices, microprocessor systems, microprocessor-based or programmable consumer electronics, minicomputers, mainframe computers and the like. The invention may also be practiced in distributed computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

It will be obvious, however, to one skilled in the art, that the present invention may be practiced without some or all of these specific details. In other instances, well known process operations have not been described in detail in order not to unnecessarily obscure the present invention.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for enhanced tuning of search engine parameters to obtain at least one optimal search result, comprising:

receiving a search parameter at a search engine equipped with a plurality of tunable knobs set at an initial setting;

generating a search result for the search parameter based on the received search parameter and the initial setting of the plurality of tunable knobs, the search result including a plurality of result objects, each of the plurality of tunable knobs associated with a weighting factor;

associating a relevancy score for each of the plurality of result objects generated by the search engine, the relevancy score associated with a tunable knob setting;

presenting the result objects from the search result;

identifying one or more of the presented result objects not selected over time, the non-selection of the result objects identifying the associated tunable knob settings;

dynamically adjusting the relevancy score of the identified one or more result objects not selected over time;

tuning the plurality of tunable knobs using one or more search algorithms to obtain an optimal search result, the tuning allowing adjustment of the tunable knobs based on the adjusted relevancy score and the non-selected result objects over time, wherein the relevancy score and the non-selected result objects identify the one or more tunable knob settings to be adjusted for obtaining an optimal search result; and further dynamically adjusting the previously dynamically adjusted one or more result objects not selected.

2. The method for enhanced tuning of search engine parameters to obtain optimal search result of claim 1, wherein generating the search result further including:

generating a first search result for the search parameter based on the received search parameter and the initial setting of the plurality of tunable knobs, the first search result having a plurality of first search result objects; and generating a second search result for the search parameter based on the received search parameter and using a second setting of the plurality of tunable knobs, the second setting of the plurality of tunable knobs obtained by adjusting one or more of the plurality of tunable knobs, the second search result having a plurality of second search result objects.

3. The method for enhanced tuning of search engine parameters to obtain optimal search result of claim 2, wherein presenting the search result further comprising:

interleaving the objects from the first search result with the objects from the second search result to generate the search result; and presenting the search result.

4. The method for enhanced tuning of search engine parameters to obtain optimal search result of claim 3, wherein the objects from the first search result and the second search result are interleaved randomly.

5. The method for enhanced tuning of search engine parameters to obtain optimal search result of claim 3, wherein the search result is an indexed set of result objects.

6. The method for enhanced tuning of search engine parameters to obtain optimal search result of claim 1, wherein presenting the search result is based on the adjusted relevancy score of each of the result objects and the weighting factor associated with each of the tunable knobs such that the most significant result objects are presented at the top of the search result.

7. The method for enhanced tuning of search engine parameters to obtain optimal search result of claim 1, wherein dynamically adjusting the relevancy score further comprising penalizing non-selected result objects using a pre-set value.

8. The method for enhanced tuning of search engine parameters to obtain optimal search result of claim 7, wherein penalizing non-selected result objects is defined by one or more criteria.

9. The method for enhanced tuning of search engine parameters to obtain optimal search result of claim 1, wherein the relevancy score associated with each search object is maintained in a database available to the search engine.

10. The method for enhanced tuning of search engine parameters to obtain optimal search result of claim 1, wherein tuning the plurality of tunable knobs is by choosing one tunable knob at a time and adjusting the knob to obtain a more optimal search result.

11. The method for enhanced tuning of search engine parameters to obtain optimal search result of claim 1, wherein tuning the plurality of tunable knobs is by choosing a plurality of tunable knobs at a time and adjusting the plurality of tunable knobs to obtain a more optimal search result.

12. The method for enhanced tuning of search engine parameters of claim 1, wherein tuning the plurality of tunable knobs is to identify at least a local maxima and at least a global maxima using one or more search algorithms.

13. The method for enhanced tuning of search engine parameters of claim 12, wherein tuning the plurality of tunable knobs is to identify the global maxima, the global maxima determining the optimal setting of the tunable knobs for arriving at an optimal search result.

14. A method of assigning a relevancy score to a plurality of result objects to obtain an optimal search result, the method comprising:

receiving a search parameter at a search engine;

generating a search result for the search parameter based on the received search parameter, the search result including a plurality of result objects, wherein at least one result object of the plurality of result objects comprises a link;

associating a relevancy score for each of the plurality of result objects generated by the search engine;

presenting the result objects from the search result as a list of the result objects on at least one page;

identifying one or more of the presented result objects not selected over time;

dynamically adjusting the relevancy score of the identified one or more result objects not selected over time based on a position of the one or more result objects not selected on the at least one page; and using the adjusted relevancy score of the one or more result objects not selected to obtain the optimal search result, wherein the dynamically adjusting comprises adjusting any result objects not selected that are situated above a selected result object on the at least one page more than any result objects not selected that are situated below the selected result object on the at least one page.

15. A method of assigning a relevancy score to a plurality of result objects to obtain an optimal search result, the method comprising:

receiving a search parameter at a search engine;

generating a search result for the search parameter based on the received search parameter, the search result including a plurality of result objects, wherein at least one result object of the plurality of result objects comprises a link;

associating a relevancy score for each of the plurality of result objects generated by the search engine;

presenting the result objects from the search result as a list of the result objects on at least one page;

identifying one or more of the presented result objects not selected over time;

dynamically adjusting the relevancy score of the identified one or more result objects not selected over time based on a position of the one or more result objects not selected on the at least one page; and using the adjusted relevancy score of the one or more result objects not selected to obtain the optimal search result, wherein the dynamically adjusting comprises adjusting any result objects not selected that can be viewed on the at least one page without scrolling the at least one page more than any result objects not selected that can be viewed on the at least one page only after scrolling the at least one page.

* * * * *

UNITED STATES PATENT AND TRADEMARK OFFICE
CERTIFICATE OF CORRECTION

PATENT NO. : 7,716,218 B1  
APPLICATION NO. : 11/880149  
DATED : May 11, 2010  
INVENTOR(S) : Michael Pogue Page 1 of 1

It is certified that error appears in the above-identified patent and that said Letters Patent is hereby corrected as shown below:

On sheet 2 of 5, in Figure 2, line 1, below "Box 215" insert -- ↓ --.

On sheet 2 of 5, in Figure 2, line 1, below "Box 230" insert -- ↓ --.

In column 6, line 11, delete "$K_1{'}$" and insert -- $K_i{'}$ --, therefor.

In column 10, line 7, delete "ResultSet1. search( );" and insert -- ResultSet1=search( ); --, therefor.

In column 10, line 15, delete ")" and insert -- } --, therefor.

In column 10, line 46, after "newDeltaUsingOneOf" insert -- ( --.

Signed and Sealed this  
Twenty-sixth Day of July, 2011

David J. Kappos  
*Director of the United States Patent and Trademark Office*